(12) United States Patent
Takano (10) Patent No.: US 7,620,114 B2
(45) Date of Patent: Nov. 17, 2009

(54) SYSTEM, METHOD, APPARATUS, AND COMPUTER PROGRAM FOR WIRELESS COMMUNICATION

(75) Inventor: Hiroaki Takano, Saitama (JP)

(73) Assignee: Sony Corporation, Tokyo (JP)

( * ) Notice: Subject to any disclaimer, the term of this patent is extended or adjusted under 35 U.S.C. 154(b) by 412 days.

(21) Appl. No.: 11/000,192

(22) Filed: Dec. 1, 2004

(65) Prior Publication Data

US 2005/0249151 A1 Nov. 10, 2005

(30) Foreign Application Priority Data

May 10, 2004 (JP) ............................. 2004-140485

(51) Int. Cl.
*H04B 7/00* (2006.01)
(52) U.S. Cl. ..................................... 375/267
(58) Field of Classification Search ................. 375/134, 375/145, 149, 260, 267; 370/208, 210
See application file for complete search history.

(56) References Cited

U.S. PATENT DOCUMENTS

| 6,058,105 | A * | 5/2000 | Hochwald et al. ........... 370/310 |
|---|---|---|---|
| 2003/0031264 | A1 | 2/2003 | Barry et al. |
| 2004/0192218 | A1* | 9/2004 | Oprea .......................... 455/73 |
| 2004/0219899 | A1* | 11/2004 | Ho et al. ..................... 455/273 |
| 2005/0094741 | A1* | 5/2005 | Kuroda ....................... 375/267 |
| 2005/0095996 | A1* | 5/2005 | Takano ......................... 455/91 |
| 2005/0141631 | A1* | 6/2005 | Takano ....................... 375/267 |
| 2005/0249303 | A1* | 11/2005 | Takano ....................... 375/267 |
| 2006/0153062 | A1* | 7/2006 | Tanabe et al. ............... 370/208 |

FOREIGN PATENT DOCUMENTS

JP      H10-84324      3/1998

OTHER PUBLICATIONS

Yoshitaka Hara, et al., "Weight Control Scheme for MIMO System with Multiple Transmitter and Receiver Beamforming". Electronics and Communications, vol. 88, No. 6. XP-001227222, 2005, pp. 55-70.

G. Lebrun, et al., "MIMO Transmission over a Time-Varying Channel Using SVD", IEEE GLOBECOM TelecommunicationsConference, vol. 1 of 3, XP-010635984, Nov. 17, 2002, pp. 414-418.

(Continued)

*Primary Examiner*—Young T. Tse
(74) *Attorney, Agent, or Firm*—Oblon, Spivak, McClelland, Maier & Neustadt, L.L.P.

(57) ABSTRACT

The disclosed invention implements SVD-MIMO communication efficiently with a less number of high-load calculation required for singular value decomposition (SVD) processing for a channel matrix. A receiver derives a channel matrix H from a reference signal from a transmitter and acquires downlink transmit weights V and receive weights $U^H$ by SVD of the channel matrix H. The receiver transmits a reference signal weighted with U* to the transmitter, where U* is a conjugate matrix for U as uplink transmit weights. The transmitter receives the reference signal weighted with U* and separates the signal into downlink transmit weights V and a diagonal matrix D, based on unitary matrix properties.

11 Claims, 4 Drawing Sheets

OTHER PUBLICATIONS

ETSI TS 101 761-1 V.1.2.1 (Nov. 2000) "Broadband Radio Access Networks (BRAN); HIPERLAN Type 2; Data Link Control (DLC) Layer; Part 1: Basic Data Transport Functions".

ETSI TS 101 761-2 V1.1.1 (Apr. 2000) "Broadband Radio Access Networks (BRAN); HIPERLAN Type 2; Data Link Control (DLC) Layer; Part2: Radio Link Control (RLC) sublayer".

IEEE Std 802.11a-1999, "Supplement to IEEE Standard for Information technology—Telecommunications and information exchange between systems—Local and metropolitan area networks—Specific requirements—Part 11: Wireless LN Medium Access Control (MAC) and Physical Layer (PHY) specifications: High-speed Physical Layer in the 5 GHz Band".

http://web.archive.org/web/20031024-re__ /http://radio3.ee.uec.ac.jp/MIMO-IEICE-TB.pdf (as of Oct. 24, 2003), Yoshio Karasawa, "MIMO 情報伝送の基礎" (with English Translation "Fundamentals of MIMO Information Transmissions").

* cited by examiner

SYSTEM, METHOD, APPARATUS, AND COMPUTER PROGRAM FOR WIRELESS COMMUNICATION

CROSS REFERENCES TO RELATED APPLICATIONS

The present invention contains subject matter related to Japanese Patent Application JP 2004-140485 filed in the Japanese Patent Office on May 10, 2004, the entire contents of which being incorporated herein by reference.

BACKGROUND OF THE INVENTION

1. Field of the Invention

The present invention relates to a system, apparatus, method, and computer program for wireless communication to implement a wideband radio transmission between a plurality of wireless nodes or terminals, as typically performed in a wireless Local Area Network (LAN). In particular, this invention relates to such a system, apparatus, method, and computer program for wireless communication that enhance communication capacity by carrying out Multi Input Multi Output (MIMO) communication using multiple logical channels formed between a pair of a transmitter with multiple antennas and a receiver with multiple antennas by exploiting spatial multiplexing.

More specifically, this invention relates to such a system, apparatus, method, and computer program for wireless communication that carry out closed-loop MIMO transmission, using singular value decomposition (SVD) of a channel matrix with elements that are channels for pairs of transmit antennas and receive antennas, and, in particular, to the system, apparatus, method, and computer program for wireless communication that implement SVD-MIMO communication with a less number of high-load calculation required for SVD processing for a channel matrix.

2. Description of Related Art

Sharing information resources and equipment resources can efficiently be implemented by computer networking typified by LAN. Now, wireless LANs draw attention as systems that free users from cable wiring in traditional wired LANs. Because the wireless LANs can dispense with most of wiring cables in working spaces such as offices, communication terminals such as personal computers (PCs) can be moved more easily.

Recently, because of enhanced speed and reduced price of wireless LANs, the demand for wireless LANs is increasing significantly. Particularly, people think that they will adopt a personal area network (PAN), that is, build a small-scale wireless network with a plurality of electronic devices that are commonly used in living environments for information communication. According to Japanese Radio Regulations, different wireless communication systems and devices can be used in certain frequency bands, e.g. 2.4 GHz and 5 GHz bands, which are permitted for use without a license from the supervisory authority.

Typical standards for wireless networking include IEEE (the Institute of Electrical and Electronics Engineers) 802.11 (e.g., see non-patent document 1), HiperLAN/2 (e.g., see non-patent document 2 or non-patent document 3), IEEE 302.15.3, Bluetooth communication, etc. As for the IEEE 802.11 standard, there are also its enhanced versions IEEE 802.11a (e.g., see non-patent document 4), 802.11b, and 802.11g for different wireless communication systems and frequency bands employed.

The IEEE 802.11a standard supports a modulation scheme achieving a communication speed of up to 54 Mbps. However, there is a need for additional standards that can realize a higher bit rate of communication speed. For instance, IEEE 802.11n aims to develop a wireless LAN technology that allows for an effective throughput higher than 100 Mbps and to establish next-generation wireless LAN standards.

The MIMO communication attracts attention as one technology for realizing higher-speed wireless communication. The MIMO technology achieves enhancement in transmission capacity and communication speed, base on a MIMO system where both transmitter and receiver have multiple antenna elements, thus creating spatially multiplexed transmission channels (hereinafter referred to as "MIMO channels"). The MIMO communication makes an efficient use of a frequency band, because it exploits spatial multiplexing.

The MIMO communication scheme is such that separate transmit data streams are allocated to sub-carriers on the multiple antennas at the transmitter, the sub-carriers are transmitted over multiple virtual MIMO channels, and at the receiver, the sub-carriers received by its multiple antennas are processed and decoded into receive data. This communication scheme exploits channel characteristics, unlike simple adaptive antenna arrays at the transmitter and the receiver.

Figure 4:
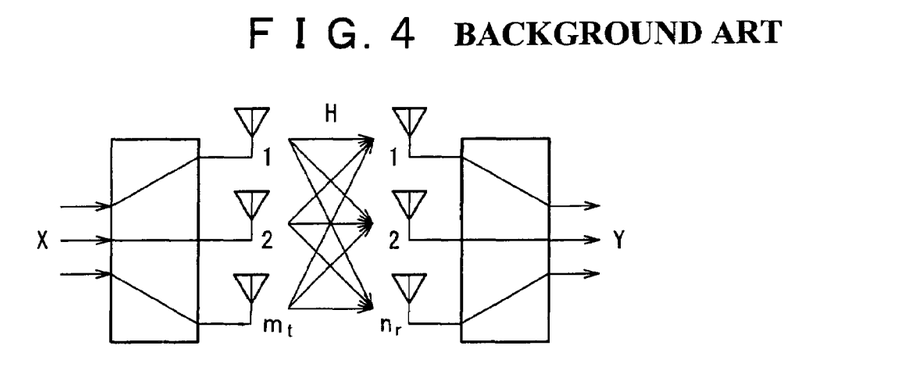
FIG. 4 is a diagram that conceptually depicts a MIMO communication system.

The MIMO communication system is conceptually depicted in FIG. 4. As shown here, both the transmitter and the receiver are equipped with multiple antennas. At the transmitter, multiple transmit data streams are space-time coded, multiplexed, and allocated to the sub-carriers on M antennas, and the sub-carriers transmitted over multiple MIMO channels. At the receiver, the sub-carriers received by N antennas via the channels are space-time decoded into receive data. This channel model consists of a radio environment (transfer function) around the transmitter, a channel space structure (transfer function) and a radio environment around the receiver (transfer function) Although crosstalk takes place when a transmit signal is multiplexed into sub-carriers and the sub-carriers are transmitted from the transmit antennas, the received multiplexed sub-carriers can be separated into respective proper data streams without crosstalk through signal processing at the receiver.

While various schemes of MIMO transmission configuration have been proposed, it is a significant problem in implementation how to communicate channel information between the transmitter and the receiver, according to the configuration of the antennas.

To communicate channel information, a method of transmitting known information (preamble information) in only one way from the transmitter to the receiver is easy. In this case, the transmitter and the receiver perform spatial multiplexing transmission independently from each other; this is called an open-loop MIMO transmission scheme. An evolved style of this method is a closed-loop MIMO transmission scheme in which ideal, spatially orthogonal channels are created by feedback of preamble information from the receiver to the transmitter as well.

An example of the open-loop MIMO transmission scheme is a Vertical Bell Laboratories Layered Space Time (V-BLAST) scheme (e.g., see patent document 1). The transmitter simply multiplexes a signal into sub-carriers on each transmit antenna and transmits the sub-carriers without assigning a matrix of antenna weighting factors to the sub-carriers. In other words, a procedure of feedback for acquiring the matrix of antenna weighting factors is dispensed with. The transmitter inserts a training signal that is used for channel estimation into the data stream on each antenna, e.g., in a time division manner, before transmitting multiplexed sub-carriers. On the other hand, at the receiver, a channel estimation section performs channel estimation, using the training signal, and calculates a channel information matrix H for every antenna pair. By way of combining zero-forcing and cancellation neatly, the receive signal SN ratio is enhanced taking advantage of spatial degrees of freedom offered by the antennas resulting from the cancellation and decoding probability is increased.

As an ideal form of the closed-loop MIMO transmission, an SVD-MMO scheme using the SVD of a propagation path function is known (e.g., see non-patent document 5).

Figure 5:
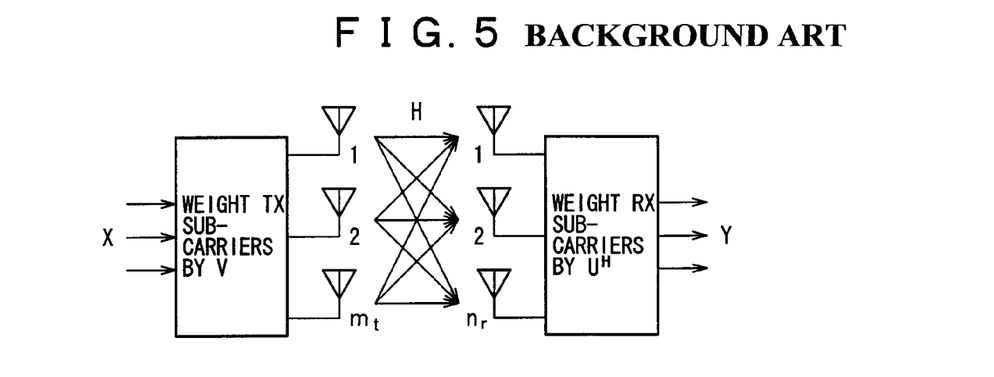
FIG. 5 is a diagram that conceptually depicts an SVD-MIMO transmission system.

An SVD-MIMO transmission system is conceptually depicted in FIG. 5. In the SVD-MIMO transmission, $UDV^H$ is obtained by singular value decomposition of a numeric matrix with elements of channel information per antenna pair, namely, a channel information matrix H. V as a matrix of antenna weighting factors at the transmitter is assigned to sub-carriers on transmit antennas and $U^H$ as a matrix of antenna weighting factors at the receiver is assigned to the sub-carriers received by receive antennas. Consequently, the MIMO channels are represented as a diagonal matrix D with diagonal elements that are square roots of eigenvalues $\lambda_i$ per channel, and the multiplexed sub-carriers of a signal can be transmitted without suffering from crosstalk at all. In this case, on both transmit and receive sides, logically independent multiple channels formed by space division, or exactly, spatially orthogonal multiplexing can be realized.

By the SVD-MIMO transmission scheme, it is possible to achieve maximum communication capacity in theory; for instance, if the transmitter and the receiver each have two antennas, the transmission capacity will be doubled at maximum.

The mechanism of the SVD-MIMO transmission scheme is now be discussed in detail. If the transmitter has M antennas, transmit signal x is represented as a set of M×1 vectors; if the receiver has N antennas, receive signal y is represented as a set of M×1 vectors. In this case, channel characteristics are represented as a numeric matrix of N×M, namely, channel matrix H. An element $h_{ij}$ of the channel matrix H corresponds to a transfer function from the j-th transmit antenna to the i-th receive antenna. Receive signal vector y is obtained by multiplying the channel information matrix by the transmit signal vector and adding noise vector n to the product, as expressed in the following equation (1).

$$y=Hx+n \quad (1)$$

The above-mentioned singular value decomposition of the channel information matrix H is expressed by the following equation (2).

$$H=UDV^H \quad (2)$$

Here, the matrix V of antenna weighting factors at the transmitter and antenna weight matrix U at the receiver are unitary matrices fulfilling the following equations (3) and (4), respectively.

$$U^H U=I \quad (3)$$

$$V^H V=I \quad (4)$$

Specifically, a set of normalized eigenvectors of $HH^H$ corresponds to the antenna weight matrix $U^H$ at the receiver and a set of normalized eigenvectors of $H^H H$ corresponds to the antenna weight matrix V at the transmitter. D is a diagonal matrix with diagonal elements that are square roots of eigenvalues $\lambda_i$ of $H^H H$ or $HH^H$. The matrix size is determined by the number of transmit antennas M or the number of receive antennas N, which is smaller; that is, a square matrix of size of min (M, N) is obtained and the diagonal matrix is obtained from the square matrix.

$$D = \begin{bmatrix} \sqrt{\lambda_1} & \cdots & & 0 \\ \vdots & \sqrt{\lambda_2} & & \\ & & \ddots & \\ 0 & & & \sqrt{\lambda_{min(M,N)}} \end{bmatrix} \quad (5)$$

Although singular value decomposition for real numbers has been discussed above, care should be taken for singular value decomposition extension up to imaginary numbers. Although U and V are matrices consisting of eigenvectors, eigenvectors with different phases, which are not singular, exist in countless numbers, even if the eigenvectors are manipulated so that a norm of 1 is obtained, in short, they are normalized. In some phasic relationship between U and V, the above equation (2) is dissatisfied, because the phases of U and V are angled differently, though both the U and V are valid. For complete phase matching, V is obtained normally as set of eigenvectors of $H^H H$. However, U is obtained by multiplying the both sides of the above equation (2) by V, as expressed in the following equation.

$$HV=UDV^H V=UDI=UD \ U=HVD^{-1} \quad (6)$$

The transmitter transmits sub-carriers weighted by the matrix V of transmit antenna weighting factors and the receiver receives the sub-carriers that are then weighted by the matrix $U^H$ of receive antenna weighting factors. This is expressed by the following equation, where U is N×min (M,N) and V is M×min (M, N), as U and V are unitary matrices.

$$\begin{aligned} y &= U^H HVx + U^H n \\ &= U^H(UDV^H)Vx + U^H n \\ &= (U^H U)D(V^H V)x + U^H n \\ &= IDIx + U^H n \\ y &= Dx + U^H n \end{aligned} \quad (7)$$

Here, receive signal y and transmit signal x have (min (M, N)×1) vectors, not determined by the number of transmit antennas and the number of receive antennas.

Because D is the diagonal matrix, the transmit signal sub-carriers can be received without crosstalk. Since the amplitude of each of the independent MIMO channels is proportional to the square root of the eigenvalue $\lambda$ for the channel, the power of each MIMO channel is proportional to $\lambda$.

Since the noise component n is also an eigenvector normalized to a norm of 1 in the U column, $U^H n$ does not affect the noise power. The size of $U^H n$ is a set of (min (M, N)) vectors, which is the same as the size of y and x.

In the SVD-MIMO transmission, in this way, logically independent multiple MIMO channels free of crosstalk can be available simultaneously in the same frequency band. Thus, using the same frequency band, multiple data streams can be transmitted simultaneously by wireless communication, and enhanced transmission speed can be achieved.

The number of MIMO channels available in the SVD-MIMO communication system matches the number of transmit antennas M or the number of receive antennas N, which is smaller, min [M, n]. The matrix V of transmit antenna weighting factors consists of as many transmit vectors $v_i$ as the number of MIMO channels ($V=[v_1, v_2, \ldots, v_{min[M, N]}]$). The elements of the transmit vectors $v_i$ are as many as the number of transmit antennas M.

Generally, in the closed-loop MIMO scheme typified by SVD-MIMO, the transmitter is capable of calculating optimum weight factors for its antennas, based on information for the propagation paths. Furthermore, it is known that, by selecting an optimal coding ratio and a modulation scheme to be applied to bit streams on transmit antenna chains, more ideal information transmission can be realized.

However, practical operation of a system of the closed-loop MIMO scheme encounters such a problem that, if the conditions of the channels vary to a great extent, as the transmitter and the receiver move, feedback from the receiver to the transmitter must occur more frequently. In the SVD-MIMO communication scheme, it is not easy to calculate the singular value decomposition in real time. In addition, it is necessary to perform a setup procedure for advanced notification of V or $U^H$ obtained by the SVD calculation to the other end of communication.

By way of example, for an Orthogonal Frequency Division Multiplexing (OFDM) communication system of IEEE 802.11a, namely, in a 5-GHz band, one LAN system to which the SVD-MIMO transmission is applied, let us consider how much will be information of the matrix V of transmit antenna factors. Given that three transmit antenna elements and three receive antenna elements are employed, the matrix V of transmit antenna factors is 3×3, having nine elements. If one element is assumed consisting of a real number and a complex number which are accurate to 10 bits and the matrices V for 52 carriers are required, 9,360 bits (=9 (elements of the matrix)×2 (the real part and imaginary part of a complex number)×10 (bits)×52 (OFDM sub-carriers) must be fed back from the receiver to the transmitter.

A point that must be considered when constructing an actual SVD-MIMO transmission/reception system is now discussed.

In the basic form of the SVD-MIMO transmission scheme, at the receiver, by the singular value decomposition for the acquired channel matrix H, a set of receive weight vectors $U^H$ and a set of transmit weight vectors V that are employed at the transmitter are obtained, and this set of the vectors V is fed back to the transmitter. At the transmitter, this set of the vectors V is used as the set of the weights for transmission.

However, in the event that the amount of transmit weight matrix V information to be fed back to the transmitter is so large and sparsified V information is transmitted back, the orthogonal state of the MIMO channels will be altered due to errors from true V information and crosstalk will occur.

In view hereof, after the receiver feedbacks the transmit weight matrix V to the transmitter, usually, the transmitter transmits a reference signal weighted with the matrix V to the receiver and the receiver acquires the channel matrix again. Given that the channel matrix is H, the receiver can acquire a channel matrix HV from the reference signal weighted by V.

At the receiver, an inverse matrix of the HV is obtained and used as a set of weights for reception. Since $H=UDV^H$, HV and its inverse will be obtained, as expressed in the equation below:

$$HV = UDV^H V \qquad (8)$$
$$= UD$$

-continued
$$(HV)^- = (UD)^-$$
$$= D^- U^-$$
$$= D^- U^H$$

This is such that, after received sub-carriers are weighted with $U^H$ in the same manner as in normal SVD-MIMO, the separated streams for the MIMO channels are merely multiplied, respectively, by constants that are derived from the diagonal elements $\lambda_i$ of the diagonal matrix D.

Arrangement in which the matrix V is used as a set of weights for transmission at the transmitter and the inverse matrix of HV is used as a set of weights for reception at the receiver is the same as performance of normal SVD-MIMO and V mismatch at the transmitter and the receiver does not occur. Therefore, this arrangement can be used practically.

[Patent document 1] JP-A No. H10-84324

[Non-patent document 1] International Standard ISO/IEC 8802-11:1999 (E) ANSI/IEEE Std 802.11, 1999 Edition, Part 11: Wireless LAN Medium Access Control (MAC) and Physical Layer (PHY) Specifications

[Non-patent document 2] ETSI TS 101 761-1 V.1.2.1 (2000-11) Broadband Radio Access Networks (BRAN); HIPERLAN Type 2; Data Link Control (DLC) Layer; Part 1: Basic Data Transport Functions

[Non-patent document 3] ETSI TS 101 761-2 V1.1.1 (2000-04) Broadband Radio Access Networks (BRAN); HIPERLAN Type 2; Data Link Control (DLC) Layer; Part 2: Radio Link Control (RLC) sublayer

[Non-patent document 4] Supplement to IEEE Standard for Information technology—Telecommunications and information exchange between systems—Local and metropolitan area networks—Specific requirements—Part 11: Wireless LN Medium Access Control (MAC) and Physical Layer (PHY) specifications: High-speed Physical Layer in the 5 GHz Band

[Non-patent document 5] http://web.archive.org/web/20031024-re/http://radio3.ee.uec.ac.jp/MIMO-IEICE-TB-.pdf (as of Oct. 24, 2003)

To carry out SVD-MIMO communication, it is necessary to acquire the channel matrix or the like. Meantime, in typical wireless communication systems, the CSMA/CA scheme is applied for collision avoidance and, at the same time, the so-called RTS/CTS procedure is performed to get a transmission right for the purpose of, for instance, solving a hiding terminal problem. Therefore, channel matrix acquisition can be performed by using packets such as RTS, CTS, DATA, and ACK and through a control procedure that will be described below (see FIG. 6). It is assumed that the transmitter acquires a set of transmit weights V before the start of the RTS/CTS procedure.

(Step 1)

Figure 6:
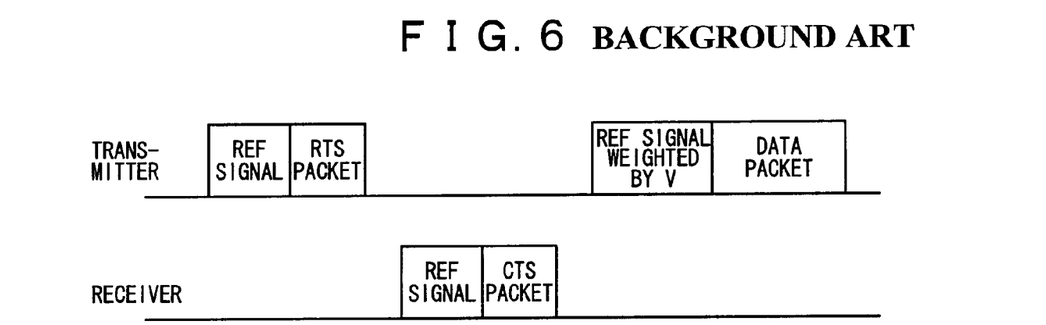
FIG. 6 is a diagram to explain bidirectional MIMO communication according to the RTS/CTS procedure.

The transmitter transmits an RTS packet to the receiver. A reference signal is attached to the RTS packet.

(Step 2)

At the receiver, a channel matrix H is acquired from the RTS packet received.

(Step 3)

At the receiver, from the acquired channel matrix H, it is determined what modulation scheme is employed and how many independent spatial channels are available.

Upon receiving the RTS, the receiver may have requirement to determine a modulation scheme to be employed. For instance, the receiver may want to stop transmission from nodes or terminals in its vicinity until the completion of ACK, using a Network Allocation Vector (NAV) which should be attached to CTS. For Short NAV setting, it is necessary to perceive the modulation scheme employed for the channel and the bit rate on the channel to calculate time for transmitting and receiving data. To determine what modulation scheme should be used at the transmitter for transmitting data, it is necessary to know the conditions of the MIMO channels, namely, eigenvalues λ per channel, derived by singular value decomposition of the matrix H, so that what conditions of the MIMO channels will be perceived at the receiver.

(Step 4)

The receiver returns a CTS to the transmitter. To the CTS, a reference signal for channel matrix estimation is attached.

(Step 5)

At the transmitter, from the reference signal attached to the CTS transmitted from the receiver, a channel matrix H in the reverse direction is acquired.

If calibration is performed to compensate for difference in the characteristics of the analog circuits in the antenna chains of the transmitter and difference in the characteristics of the analog circuits in the antenna chains of the receiver, the transfer functions in the forward and reverse directions will be the same. A method for calibrating the difference in the characteristics of the analog circuit portions at the transmitter and the receiver is described, e.g., in JP-B (Japanese Examined Patent Application Publication) 2003-426294 whose patent right has already been assigned to the present inventors.

(Step 6)

The transmitter executes singular value decomposition of the acquired matrix H in the reverse direction and determines the weights V for transmission in the forward direction. Of course, the weights V for transmission in the forward direction, obtained by singular value decomposition at the receiver, may be fed back to the transmitter; however, its information amount is excessively large. Therefore, the receiver transmits back the reference signal having a small quantity of data and the transmitter acquires V as above.

(Step 7)

In response to the reception of the CTS signal from the receiver, the transmitter transmits a data packet. To the beginning of this data packet, a reference signal weighted by V is attached, followed by user data (payload).

(Step 8)

At the receiver, a channel matrix HV is acquired from the reference signal weighted by V, its inverse matrix (see equation (8)) is obtained as a set of weights for reception, and thereby weighted user data is received.

When the SVD-MIMO communication is performed, according to the above communication procedure, each time a data transmission process by the RTS/CTS procedure is performed, two times altogether of singular value decomposition calculation at the steps 3 and 6 and one time of inverse matrix calculation at the step 8 must be executed. This poses a problem of heavy calculation loads imposed on the transmitter and receiver. Especially, the singular value decomposition calculation consumes large power when it is executed, because it uses a considerable number of multipliers. Consequently, there is a need to decrease the quantity of singular value decomposition calculation, even just one time.

SUMMARY OF THE INVENTION

The present invention addresses the above-described technical problems and its primary object is to provide a superior system, apparatus, method, and computer program for wireless communication that are able to enhance transmission capacity by carrying out MIMO communication using multiple logical channels formed by exploiting spatial multiplexing.

It is another object of this invention to provide a superior system, apparatus, method, and computer program for wireless communication that are able to carry out closed-loop MIMO transmission efficiently, using the singular value decomposition of a channel matrix with elements that are channels for pairs of transmit antennas and receive antennas.

It is a further object of this invention to provide a superior system, apparatus, method, and computer program for wireless communication that are able to implement SVD-MIMO communication efficiently with a less number of high-load calculation required for SVD processing for a channel matrix.

A first aspect of the present invention, which has been contemplated to address the foregoing objects, resides in a wireless communication system which carries out spatial multiplexing transmission with transmit and receive weights determined by utilizing a channel matrix with elements that are pairs of transmit antennas and receive antennas, wherein, in an instance where data transmission from a first communication device to a second communication device is performed, the second communication device transmits a reference signal weighted with transmit weights in the uplink direction; and the first communication device separates the reference signal received into transmit weights in the downlink direction and a diagonal matrix and transmits data with the thus obtained transmit weights.

The "system" as used herein is a complex in which a plurality of devices (or functional modules for implementing specific functions) logically joined and it is no matter whether or not each device or functional module is installed in a single chassis.

The wireless communication system of the present invention uses, for instance, the MIMO communication scheme and is able to increase transmission capacity and enhance communication speed, using spatially multiplexed transmission paths, namely, MIMO channels. In this case, both the transmitter and the receiver are equipped with multiple antennas, the transmitter allocates transmit data to multiple streams and transmits weighted streams from the transmit antennas and the receiver weights the streams received by the receive antennas.

In the wireless communication system of the present invention, the closed-loop communication scheme typified by SVD-MIMO transmission can be used. In this case, the transmitter acquires optimal transmit antenna weighting factors, based on feedback information from the receiver.

In a typical wireless communication system, nodes or terminals perform the RTS/CTS procedure to get a transmission right, while performing access control based on the CSMA/CA. In this case, to carry out SVD-MIMO communication, a reference signal for channel matrix acquisition is attached to each packet of RTS, CTS, and DATA.

However, when the SVD-MIMO communication is performed by this communication procedure, the transmitter and the receiver must perform arithmetic processing to obtain a weight matrix, each time receiving a packet from the other end; that is, they must execute singular value decomposition or inverse matrix calculation, based on the reference signal attached. Especially, the singular value decomposition calculation consumes large power during its execution, because it uses a considerable number of multipliers.

In the present invention, a communication device is arranged such that, upon receiving a reference signal weighted with transmit weights, the received signal is separated into transmit weights in the reverse direction and a diagonal matrix by suitably using unitary matrix properties. Consequently, one process of singular value decomposition can be dispensed with in the whole system and a superfluous part of the calculation amount can be removed.

For instance, the second communication device as a receiver in the SVD-MIMO transmission system acquires a channel matrix H, using the reference signal attached to an RTS packet from the first communication device as a transmitter, and, by singular value decomposition of the matrix H, can acquire transmit weights V in the downlink from the transmitter to the receiver and receive weights $U^H$. The receiver uses a conjugate matrix $U^*$ for U as transmit weights on the uplink, attaches a reference signal weighted by $U^*$ to a CTS packet spatially multiplexed with $U^*$, and transmits the CTS packet with the reference signal.

On the other hand, upon receiving the reference signal weighted by $U^*$, the transmitter can separate the received signal into transmit weights V in the reverse direction, or on the downlink, and a diagonal matrix D. Specifically, since the uplink channel matrix is represented as a transposed matrix $H^T$ for the downlink channel matrix H $(=UDV^H)$, the transmitter acquires $H^T U^* = V^* D U^T = V^* D$ when it receives the reference signal weighted by $U^*$. Based on the unitary matrix properties, the downlink transmit weights V are separated from $V^* D$.

Therefore, at the transmitter, one process of singular value decomposition is dispensed with and a superfluous part of the calculation amount can be removed.

A second aspect of the present invention resides in a computer program coded in a computer readable form to perform a process on a computer system for carrying out spatial multiplexing transmission with transmit and receive weights determined by utilizing a matrix $UDV^H$ obtained by singular value decomposition of a channel matrix H with elements that are pairs of transmit antennas and receive antennas, wherein the computer program comprises the following steps: in an instance where data communication on the downlink from the other end is performed, acquiring a downlink channel matrix H, based on a reference signal received from the other end; executing singular value decomposition of the acquired channel matrix H into $UDV^H$; receiving user data transmitted in the forward direction from the other end and weighting the user data with receive weights $U^H$ derived from the acquired channel matrix H by the singular value decomposition; and weighting a reference signal with transmit weights in the reverse direction to the other end by using a conjugate matrix $U^*$ for U obtained, based on the result of the singular value decomposition of the acquired channel matrix H, as the transmit weights, and transmitting the reference signal.

A third aspect of the present invention resides in a computer program coded in a computer readable form to perform a process on a computer system for carrying out spatial multiplexing transmission with transmit and receive weights determined by utilizing a matrix $UDV^H$ derived by singular value decomposition of a channel matrix H with elements that are pairs of transmit antennas and receive antennas, wherein the computer program comprises the following steps: in an instance where data communication on the downlink to the other end is performed, receiving a reference signal weighted with a conjugate matrix $U^*$ for U as uplink transmit weights and acquiring $H^T U^* = V^* D U^T = V^* D$; separating downlink transmit weights V from $V^* D$, based on the unitary matrix properties; and weighting data with the downlink transmit weights V and transmitting the data.

The computer programs according to the second and third aspects of the present invention are defined as those coded in a computer readable form to implement predetermined processing on a computer system. In other words, when these computer programs are installed in individual computer systems, they work cooperatively across the computer systems and cause the communication devices in which they were installed to operate mutually in carrying out data communication on their downlinks. Building a network where a plurality of such communication devices are set up can produce the same effect as the first aspect of the present invention.

The present invention can provide a superior system, apparatus, method, and computer program for wireless communication that are able to carry out closed-loop MIMO transmission efficiently, using the singular value decomposition of a channel matrix with elements that are channels for pairs of transmit antennas and receive antennas.

The present invention can provide a superior system, apparatus, method, and computer program for wireless communication that are able to implement SVD-MIMO communication efficiently with less number of high-load calculation required for SVD processing for a channel matrix.

According to the present invention, a communication device, upon receiving a reference signal weighted with transmit weights from the other end, separates the received signal into transmit weights in the reverse direction and a diagonal matrix, and thereby, the device can acquire the weights for transmission therefrom without executing singular value decomposition calculation.

Further objects, features, and advantages of the present invention will become apparent from the following detailed description of an illustrative embodiment of the invention based on the accompanying drawings.

DETAILED DESCRIPTION OF THE PREFERRED EMBODIMENTS

An illustrative embodiment of the present invention will be described fully hereinafter with reference to the accompanying drawings.

This invention relates to a MIMO communication system where spatial signal multiplexing communication is performed between a pair of a transmitter with multiple antennas and a receiver with multiple antennas.

In a typical wireless communication system, nodes or terminals perform the RTS/CTS procedure to get a transmission right, while performing access control based on the CSMA/

CA. In this case, to carry out SVD-MIMO communication, a reference signal for channel matrix acquisition is attached to each packet of RTS, CTS, and DATA.

However, when the SVD-MIMO communication is performed by this communication procedure, the transmitter and the receiver must perform arithmetic processing to obtain a weight matrix, each time receiving a packet from the other end; that is, they must execute singular value decomposition or inverse matrix calculation, based on the reference signal attached. Especially, the singular value decomposition calculation consumes large power during its execution, because it uses a considerable number of multipliers.

In the present invention, a communication device is arranged such that, upon receiving a reference signal weighted with weights for transmission, the received signal is separated into weights for transmission in the reverse direction and a diagonal matrix by suitably using the unitary matrix properties. Consequently, one process of singular value decomposition can be dispensed with in the whole system and a superfluous part of the calculation amount can be removed.

Figure 1:
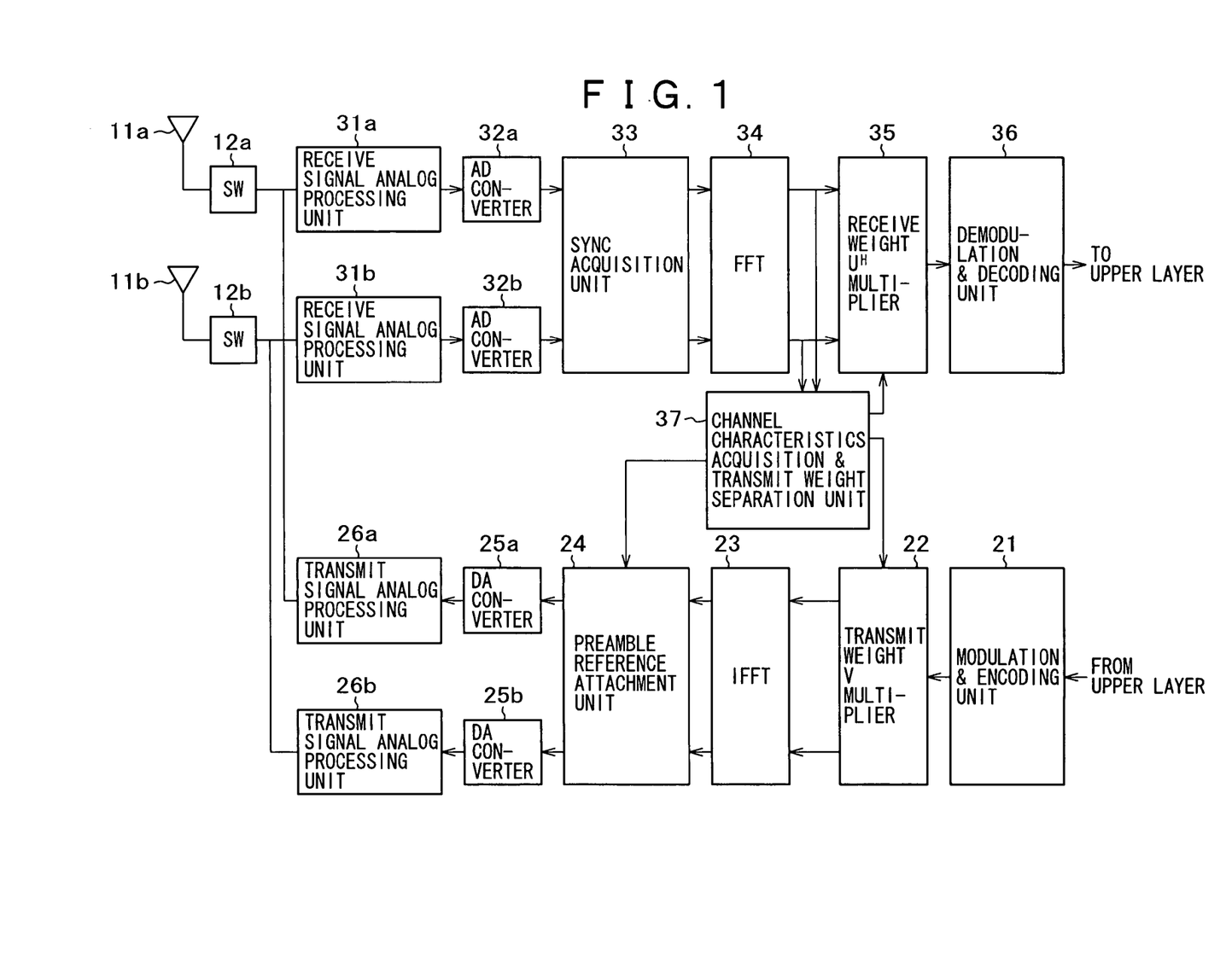
FIG. 1 is a diagram showing the configuration of a wireless communication apparatus according to an embodiment of the present invention.

FIG. 1 shows the configuration of a wireless communication apparatus according to an embodiment of the present invention.

The wireless communication apparatus shown in FIG. 1 is equipped with two transmit/receive antennas 11a and 11b and capable of data transmission in accordance with the SVD-MIMO scheme. That is, for transmission, a transmit signal is multiplexed into sub-carriers, after the sub-carriers are assigned transmit antenna weighting factors, they are space-time coded and allocated to the two antennas 11a and 11b from which they are transmitted onto respective channels. For reception, the multiplexed sub-carries received by the two antennas 11a and 11b via the respective channels are assigned receive antenna weighting factors and space-time decoded into receive data. However, the gist of the present invention is not limited to two antennas and three or more antennas may be employed.

Transmission chains and reception chains are connected in parallel to the two transmit/receive antennas 11a and 11b via switches 12a and 12b for wireless transmission of signals over a predetermined frequency channel to any other wireless communication apparatus or reception of signals transmitted from any other wireless communication apparatus. However, the switches 12a and 12b connect the transmit/receive antennas 11a and 11b to either a transmission chain or a reception chain exclusively at a time and each antenna is unable to perform concurrent transmission and reception.

Each transmission chain is comprised of a modulation and encoding unit 21, a transmit weight multiplier 22, IFFT 23, a preamble/reference attachment unit 24, a D/A converter 25, and a transmit signal analog processing unit 26.

The modulation and encoding unit 21 encodes transmit data sent from an upper layer of a communication protocol by error correction coding and map transmit signals in a signal space, using a predetermined modulation scheme such as BPSK, QPSK, and 16QAM. At this time, a known data string may be inserted as a pilot symbol into a modulated symbol sequence, according to pilot symbol insertion pattern and timing. One pilot signal consisting of a known pattern may be inserted for every sub-carrier or for every several sub-carriers.

The transmit weight multiplier 22 multiplies encoded transmit signals by a transmit weight matrix V, which creates multiple MIMO channels by spatial multiplexing. The transmit weight matrix V is created, based on feedback information from the other end of communication, and set in the transmit weight multiplier 22.

The IFFT 23 converts modulated serial signals into parallel constellations of data for parallel sub-carriers, according to parallel sub-carriers number and timing, performs Inverse Fast Fourier Transform on the parallel constellations per block of FFT size, according to predetermined FFT size and timing. Here, a guard interval may be inserted between every two OFDM symbols to eliminate inter-symbol interference. The guard interval length is determined by transmission path condition, that is, the maximum delay time of delayed waves that affect modulation. Then, the parallel data is converted into serial signals which are in turn transformed into transmit signals on the time axis, while keeping mutual orthogonality of the sub-carriers on the frequency axis.

The preamble/reference attachment unit 24 attaches a preamble signal and a reference signal to the beginning of a packet of transmit signals such as RTS, CTS, and DATA.

If the wireless communication apparatus operates as the transmitting end of downlink transmission, the preamble/reference attachment unit 24 multiples a reference signal to be transmitted to the receiving end on the downlink by V, where V is the weights for transmission.

If the wireless communication apparatus operates as the receiving end of downlink transmission, the preamble/reference attachment unit 24 multiples a reference signal to be transmitted to the transmitting end on the uplink by U*, where a conjugate matrix U* for U is used as the uplink transmit weights. In this case, a channel characteristics acquisition and transmit weight separation unit 37 acquires a channel matrix H, using the reference signal transmitted on the downlink from the transmitting end, and, by singular value decomposition of the channel matrix, acquires the transmit weights V on the downlink from the transmitter to the receiver and receive weights $U^H$, and passes U* as the transmit weights for a reference signal to the preamble/reference attachment unit 24. Detailed operation of the channel characteristics acquisition and transmit weight separation unit 37 will be discussed later.

The transmit signals are then converted into analog baseband signals by the D/A converter 25, the baseband signals are further up-converted into those in an RF frequency band by the transmit signal analog processing unit 26, and the RF signals are transmitted onto each MIMO channel from the antenna 11.

On the other hand, each reception chain is comprised of a receive signal analog processing unit 31, an A/D converter 32, a sync acquisition unit 33, FFT 34, a receive weight multiplier 35, a demodulation and decoding unit 36, and the channel characteristics acquisition and transmit weight separation unit 37.

Signals received by the antenna 11 are down-converted from the RF frequency band into baseband signals by the receive signal analog processing unit 31 and the baseband signals are converted into digital signals by the A/D converter 32.

Then, according to synchronization timing detected by the sync acquisition unit 33, the received signals as serial data are converted into constellations of parallel data (one constellation consists of one OFDM symbol including a guard interval). Fast Fourier Transform on signals per effective symbol length is performed by the FFT 34; by extracting each sub-carrier signal, the signals on the time axis are transformed into those on the frequency axis.

The channel characteristics acquisition and transmit weight separation unit 37 first acquires a channel matrix H, using a reference signal whose sub-carriers for multiplexed transmission were weighted discretely per sub-carrier at the other end. Subsequent singular value decomposition of the channel matrix H can decompose the channel matrix into a transmit weight matrix V, receive weight matrix $U^H$, and diagonal matrix D. If reference signals are transmitted from the other end at given intervals, the channel characteristics acquisition and transmit weight separation unit 37 updates the channel matrix H, each time a reference signal is received, and executes singular value decomposition of the updated one.

The receive weight matrix $U^H$ derived from the channel matrix through singular value decomposition is set in the receive weight multiplier 35 of the apparatus being discussed and the transmit weight matrix V is fed back to the other end. However, as the receive weight matrix, $D^-U^H$, the inverse matrix of HV may be used instead of $U^H$ (see equation (8) and related description in the foregoing section). The acquired transmit weight matrix V is passed to the transmit weight multiplier 22.

If the wireless communication apparatus operates as the receiving end of downlink transmission, the channel characteristics acquisition and transmit weight separation unit 37 passes the conjugate matrix U* for U obtained by singular value decomposition of the channel matrix H to the preamble/reference attachment unit 24 as the transmit weights for a reference signal.

The channel characteristics acquisition and transmit weight separation unit 37 can acquire the transmit weights V without executing singular value decomposition. That is, if the wireless communication apparatus operates as the transmitting end of downlink transmission, when a reference signal weighted with U* is received on the uplink from the receiving end, since the uplink channel matrix is represented as a transposed matrix $H^T$ for the downlink channel matrix H (=$UDV^H$), $H^TU^*=V^*DU^T=V^*D$ is obtained. Then, the downlink transmit weights V are separated from V*D, based on the unitary matrix properties. The thus acquired transmit weight matrix V is passed to the transmit weight multiplier 22.

Detailed operation of the channel characteristics acquisition and transmit weight separation unit 37 will be further discussed later.

The receive weight multiplier 35 multiplies receive signals with receive weight matrix $U^H$ or $D^-U^H$, obtained by singular value decomposition of the channel matrix H, which spatially demultiplexes the spatially multiplexed receive signals.

Furthermore the demodulation and decoding unit 36 demaps the thus weighted receive signals from the signal space by a predetermined scheme such as BPSK, QPSK, and 16QAM, carries out error correction on the signals, and decodes them into receive data which is in turn passed to the upper layer of the communication protocol.

Here, if access operation based on the CSMA/CA communication scheme is performed, according to the RTS/CTS procedure, the wireless communication apparatus that operates a transceiver would attach a reference signal for channel matrix acquisition to each packet of RTS, CTS, and DATA and acquire transmit and receive weight factors, using the reference signal. In general, a weight matrix can be obtained by singular value decomposition of a channel matrix; however, this poses a problem in which singular value decomposition calculation consumes large power when it is executed, because it uses a considerable number of multipliers. In the present embodiment, the channel characteristics acquisition and transmit weight separation unit 37 can acquire weight factors without executing singular value decomposition.

Figure 2:
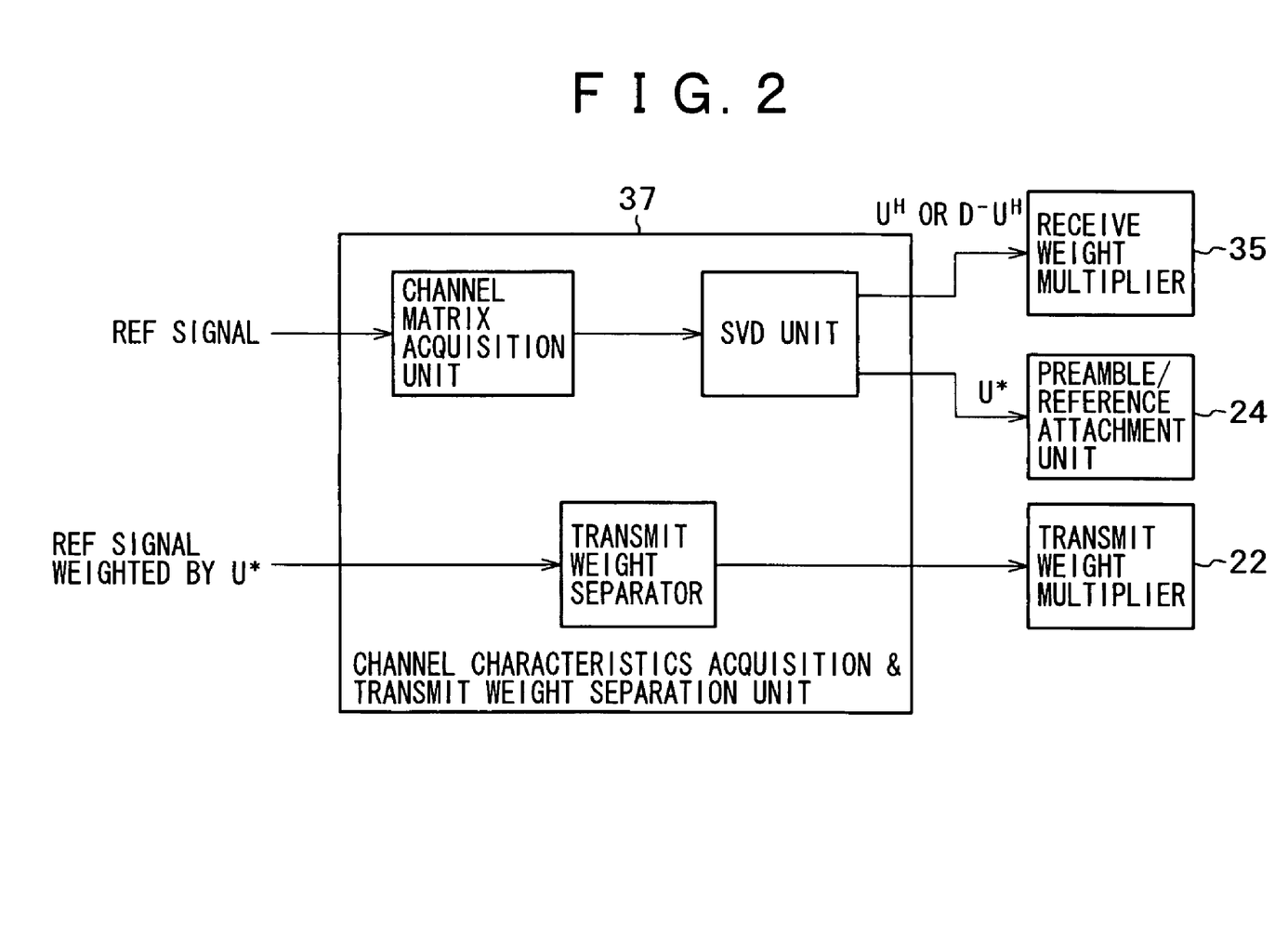
FIG. 2 is a diagram that schematically depicts the functional structure of a channel characteristics acquisition and transmit weight separation unit.

FIG. 2 schematically depicts the functional structure of the channel characteristics acquisition and transmit weight separation unit 37. As shown, the channel characteristics acquisition and transmit weight separation unit 37 is comprised of a channel matrix acquisition unit, a singular value decomposition unit, and a transmit weight separator.

The channel matrix acquisition unit acquires a channel matrix H, using a reference signal whose sub-carriers for multiplexed transmission were weighted discretely per sub-carrier at the other end.

The singular value decomposition unit executes singular value decomposition of the acquired channel matrix H into a transmit weight matrix V, receive weight matrix $U^H$, and diagonal matrix D. The thus derived receive weight matrix $U^H$ is set in the receive weight multiplier 35 of the apparatus being discussed and the transmit weight matrix V is fed back to the other end. However, as the receive weight matrix, $D^-U^H$, the inverse matrix of HV may be used instead of $U^H$ (see equation (8) and related description in the foregoing section). Also, the singular value decomposition unit passes the conjugate matrix U* for U obtained by singular value decomposition of the channel matrix H to the preamble/reference attachment unit 24 as the transmit weights for a reference signal.

If reference signals are transmitted from the other end at given intervals, the channel characteristics acquisition and transmit weight separation unit 37 updates the channel matrix H, each time a reference signal is received, and executes singular value decomposition of the updated one.

The transmit weight separator, when receiving a reference signal weighted with U* from the receiving end, obtains $H^TU^*=V^*DU^T=V^*D$, as the uplink channel matrix is represented as a transposed matrix $H^T$ for the downlink channel matrix H (=$UDV^H$). Then, the transmit weight separator separates the downlink transmit weights V from V*D, based on the unitary matrix properties, and passes the thus obtained transmit weight matrix V to the transmit weight multiplier 22.

Now, arithmetic processing that is executed by the transmit separator for separating the transmit weights V from the reference signal weighted with U* received on the uplink from the receiving end is discussed. In the following, it is assumed that the downlink from the transmitter to the receiver is the forward direction and the uplink from the receiver to the transmitter is the reverse direction.

In this case, the channel matrix in the forward direction is expressed by the following equation, where n is the number of antennas of the transmitter and m is the number of antennas of the receiver, and $h_{ij}$ denotes the transfer function from the j-th antenna of the transmitter to the i-th antenna of the receiver.

$$\text{Channel matrix in the forward direction} = \begin{bmatrix} h_{11} & h_{12} & \cdots & h_{1n} \\ h_{21} & \ddots & & \\ \vdots & & \ddots & \\ h_{m1} & & & h_{mn} \end{bmatrix} \quad (9)$$

On the other hand, the channel matrix in the reverse direction is expressed by the following equation.

$$\text{Channel matrix in the reverse direction} = \begin{bmatrix} h_{11} & h_{21} & \cdots & h_{m1} \\ h_{12} & \ddots & & \\ \vdots & & \ddots & \\ h_{1n} & & & h_{mn} \end{bmatrix} \quad (10)$$

In other words, the channel matrix in the reverse direction is represented as the transposed matrix $H^T$ for the channel matrix H in the forward direction.

At the receiver, after the channel matrix H in the forward direction is derived from the reference signal from the transmitter, the matrix H is decomposed into $UDV^H$ by singular value decomposition, as expressed in the following equation.

$$H = UDV^H \quad (11)$$

Hence, the channel matrix in the reverse direction from the receiver to the transmitter is obtained, as expressed in the following equation.

$$H^T = (UDV^H)^T = V^*DU^T \quad (12)$$

The receiver transmits a reference signal on the uplink to the transmitter, after weighting the reference signal with the conjugate matrix U* for the matrix U obtained by singular value decomposition of the channel matrix H in the forward direction.

Then, the transmitter receives the reference signal in which the channel matrix $H^T$ in the reverse direction by U*. Hence, the transmitter can obtain the following equation.

$$H^T U^* = (UDV^H)^T U^* = V^*DU^T U^* = V^*D \quad (13)$$

If V can be separated from the V*D, singular value decomposition becomes unnecessary at the transmitter. A method for separating V*D into V and D will be described below.

V is an unitary matrix consisting of eigenvectors as many as the number of MIMO channels (=min [n, m]). Each eigenvector u is normalized to a norm of 1.

$$V = [u_1, u_2, \ldots, u_{min(n,m)}] \quad (14)$$

Hence, combined UD=V*D obtained at the receiver is such that an eigenvector elements in each column is multiplied by an eigenvalue, as expressed in the following equation.

$$V^*D = [\sqrt{\lambda_1} \times u_1, \sqrt{\lambda_2} \times u_2, \ldots, \sqrt{\lambda_{min(n,m)}} \times u_{min(n,m)}] \quad (15)$$

Then, a norm of matrix elements for each column of V*D is calculated. Since the value of the norm for each column corresponds to each diagonal element, V* can be separated.

The transmitter transmits a reference signal weighted by V, followed by user data. At the receiver, HV is derived from the reference signal multiplied by V. The user data weighted with the inverse matrix of the HV (see equation (8)) is received.

When the above-described method is used, one time of singular value decomposition and one time of inverse matrix calculation are merely executed to obtain the same result as obtained by two times of singular value decomposition and one time of inverse matrix calculation.

Figure 3:
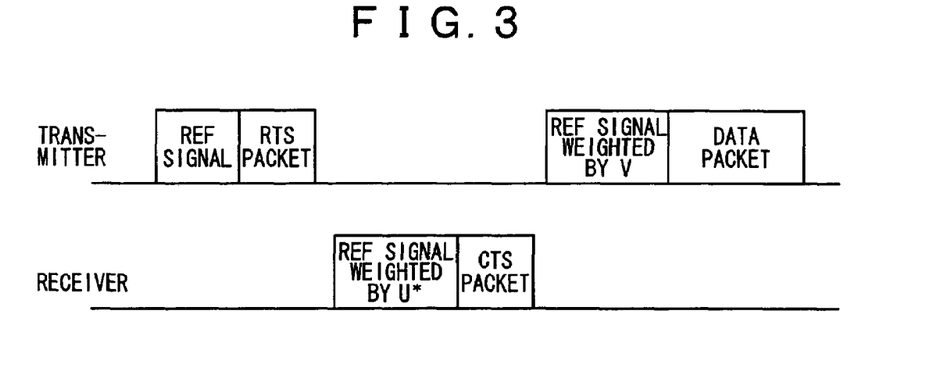
FIG. 3 is a diagram to explain MIMO communication according to the RTS/CTS procedure.

In the following, the procedure for MIMO communication of RTS, CTS, and DATA in a wireless communication system relevant to the present embodiment will be described with reference to FIG. 3. At the transmitter, processing for acquiring a transmit weight matrix V is assumed finished beforehand.

(Step 1)

A reference signal is transmitted from the transmitter to the receiver. The receiver can acquire a channel matrix H.

(Step 2)

At the receiver, matrix U is obtained by singular value decomposition of the channel matrix H (see equation (10)).

(Step 3)

A reference signal weighted with U* is transmitted from the receiver to the transmitter.

(Step 4)

At the transmitter, $V^*DU^T U^* = V^*D$ is derived from the reference signal weighted with U* (see equation (13)).

(Step 5)

By calculating the norm for each column of the obtained V*D, V*D is separated into V and D. As a result, D can be obtained without singular value decomposition and V also can be obtained.

(Step 6)

The transmitter transmits a reference signal weighted with V, followed by user data.

(Step 7)

At the receiver, by receiving the reference signal weighted with V from the transmitter, a channel matrix HV=UD is acquired.

(Step 8)

At the receiver, the inverse matrix of the channel matrix UD is calculated and this matrix is retained as weights for reception.

(Step 9)

Using the weights for reception obtained in step 8, the user data transmitted from the transmitter is decoded.

Although having described in detail the present invention with reference to its specific embodiment, it will now be apparent to those skilled in the art that modifications and alterations can be made therein without departing from the scope of the gist of the invention.

The present invention can be applied to various types of wireless communication systems that perform data transmission by way of spatial multiplexing. That is, the gist of the present invention and its application scope are not limited to space division, or exactly, spatially orthogonal multiplexing transmission schemes like the SVD-MIMO scheme. The present invention can suitably be applied to other similar communication systems that carry out weighted transmission/reception based on a channel matrix H obtained from the conditions of the transmission paths.

In other words, a preferred embodiment of the present invention has been disclosed for illustrative purposes and the description in this specification should not be construed to limit the present invention. In interpreting the gist of the invention, appended claims should be referenced and taken into consideration.

What is claimed is:

1. A wireless communication system which carries out spatial multiplexing transmission with transmit and receive weights determined by utilizing a channel matrix with elements that are pairs of transmit antennas and receive antennas, the system comprising:
a first communication device including a transmit weight separator;
a second communication device configured to weight a reference signal with a first weight matrix U* to produce a weighted reference signal and transmit the weighted reference signal to the first communication device, the first weight matrix U* including a conjugate matrix of a second weight matrix U and produce the first weight matrix U* based on singular value decomposition of the channel matrix H in a direction from the first communication device to the second communication device;
the transmit weight separator is configured to receive the weighted reference signal from the second communication device and separate the weighted reference signal into a third weight matrix V and a diagonal matrix D; and
the first communication device is further configured to weight data with the third weight matrix V to produce weighted data and transmit the weighted data to the second communication device.

2. The wireless communication system according to claim 1, which carries out the spatial multiplexing transmission with the transmit and receive weights determined by utilizing a matrix $UDV^H$ obtained by the singular value decomposition of the channel matrix H with elements that are pairs of the transmit antennas and the receive antennas, wherein U is the second weight matrix, D is the diagonal matrix, and $V^H$ is a conjugate transposed matrix of the third of a third weight matrix V, wherein said second communication device acquires the channel matrix H, using a reference signal from said first communication device, acquires the third weight matrix V in the direction from the first communication device as a transmitter to the second communication device as a receiver, receives the receive weights $U^H$ by the singular value decomposition of the channel matrix H, and transmits the reference signal weighted with U* to the first communication device, where U* is the conjugate matrix for U as the receive weights in the direction from the second communication device to the first communication device, and wherein said first communication device, upon receiving the reference signal weighted with U*, separates the received signal into the third weight matrix V in the direction from the first communication device to the second communication device and the diagonal matrix D by suitably using unitary matrix properties.

3. The wireless communication system according to claim 2, wherein said first communication device acquires $H^T U^* = V^* D U^T = V^* D$, wherein $H^T$ is a transposed matrix of the channel matrix H, and $U^T$ is a transposed matrix of the second weight matrix U, by receiving the reference signal weighted with U* in the direction from the second communication device to the first communication device, the channel matrix H in this direction being the transposed matrix $H^T$ for the channel matrix $H = UDV^H$ in the direction from the first communication device to the second communication device, and separates the third weight matrix V in the direction from the second communication device to the first communication device from V*D, based on the unitary matrix properties.

4. A wireless communication apparatus which carries out spatial multiplexing transmission with transmit and receive weights determined by utilizing a matrix $UDV^H$ obtained by singular value decomposition of a channel matrix H with elements that are pairs of transmit antennas and receive antennas, wherein U is a second weight matrix, D is a diagonal matrix, and $V^H$ is a transposed matrix of a third weight matrix V, said wireless communication apparatus comprising:

a channel matrix acquisition unit which acquires the channel matrix H in a direction from a first communication device to a second communication device, based on a reference signal received from other end;

a singular value decomposition unit which executes the singular value decomposition of the acquired channel matrix H into the matrix $UDV^H$;

a receiving section which receives user data transmitted in a forward direction from the other end and weights the user data with the receive weights $U^H$ derived from the acquired channel matrix H through the singular value decomposition unit; and a transmitting section which weights a reference signal with the third weight matrix V in a reverse direction to the other end by using a conjugate matrix U* for U obtained, based on a result of the singular value decomposition of the acquired channel matrix H, as the transmit weights, and transmits the reference signal with the transmit weights.

5. A wireless communication apparatus which carries out spatial multiplexing transmission with transmit and receive weights determined by utilizing a channel matrix with elements that are pairs of transmit antennas and receive antennas, said wireless communication apparatus comprising:

a receiving section which receives a reference signal weighted with a first weight matrix U* including a conjugate matrix of a second weight matrix U and produces the first weight matrix U* on singular value decomposition of the channel matrix H;

a separator which separates the received signal into a third weight matrix V in a reverse direction and a diagonal matrix D; and a transmitting section which transmits data weighted with the third weight matrix V obtained by said separator in the reverse direction to the direction in which said reference signal was received.

6. The wireless communication apparatus according to claim 5, in an instance where data communication to another end in a direction from a first communication device to a second communication device is performed, wherein:

said receiving section receives the reference signal weighted with the first weight matrix U* which is the conjugate matrix for U as the receive weights in a direction from the second communication device to the first communication device;

said separator separates the received signal into the third weight matrix V in the direction from the first communication device to the second communication device and the diagonal matrix D; and said transmitting section transmits the data weighted with the third weight matrix V as the transmit weights in the direction from the first communication device to the second communication device.

7. The wireless communication apparatus according to claim 6, wherein:

the channel matrix H in the direction from the second communication device to the first communication device is a transposed matrix $H^T$ for the channel matrix $H = UDV^H$ in the direction from the first communication device to the second communication device, wherein $V^H$ is a transposed matrix of the third weight matrix V;

said receiving section acquires $H^T U^* = V^* D U^T = V^* D$, wherein $H^T$ is the transposed matrix of the channel matrix H, and $U^T$ is a transposed matrix of the second weight matrix U, by receiving the reference signal weighted with U* in the direction from the second communication device to the first communication device; and said separator separates the transmit weights in the direction from the first communication device to the second communication device from V*D, based on unitary matrix properties.

8. A wireless communication method for carrying out spatial multiplexing transmission with transmit and receive weights determined by utilizing a matrix $UDV^H$ obtained by singular value decomposition of a channel matrix H with elements that are pairs of transmit antennas and receive antennas, wherein U is a second weight matrix, D is a diagonal matrix, and $V^H$ is a transpose matrix of a third weight matrix V, said wireless communication method comprising the steps of:

acquiring the channel matrix H in a direction from a first communication device to a second communication device, based on a reference signal received from other end;

executing the singular value decomposition of the acquired channel matrix H into the matrix $UDV^H$;

receiving user data transmitted in a forward direction from the other end and weighting the user data with the receive weights $U^H$ derived from the acquired channel matrix H by the singular value decomposition; and weighting a reference signal with the third weight matrix V in a reverse direction to the other end by using a conjugate matrix $U^*$ for U obtained, based on a result of the singular value decomposition of the acquired channel matrix H, as the transmit weights, and transmitting the reference signal with the transmit weights.

9. A wireless communication method for carrying out spatial multiplexing transmission with transmit and receive weights determined by utilizing a matrix $UDV^H$ obtained by singular value decomposition of a channel matrix H with elements that are pairs of transmit antennas and receive antennas, wherein U is a second weight matrix, D is a diagonal matrix, and $V^H$ is a transposed matrix of a third weight matrix V, said wireless communication method comprising the steps of:

receiving a reference signal weighted with a conjugate matrix $U^*$ for U as the receive weights in a direction from a second communication device to a first communication device and acquiring $H^T U^* = V^* D U^T V^* D$, wherein $H^T$ is a transposed matrix of the channel matrix H, and $U^T$ is a transposed matrix of the second weight matrix U;

separating the third weight matrix V as the transmit weights in a direction from the first communication device to the second communication device from $V^* D$, based on unitary matrix properties; and weighting data with the transmit weights in the direction from the first communication device to the second communication device and transmitting the data.

10. A computer readable medium embodying a program of instructions executable by a computer to perform a method of carrying out spatial multiplexing transmission with transmit and receive weights determined by utilizing a matrix $UDV^H$ obtained by singular value decomposition of a channel matrix H with elements that are pairs of transmit antennas and receive antennas, wherein U is a second weight matrix, D is a diagonal matrix, and $V^H$ is a transposed matrix of a third weight matrix V, said method comprising the steps of:

acquiring the channel matrix H in a direction from a first communication device to a second communication device, based on a reference signal received from other end;

executing singular value decomposition of the acquired channel matrix H into the matrix $UDV^H$;

receiving user data transmitted in a forward direction from the other end and weighting the user data with the receive weights $U^H$ derived from the acquired channel matrix H by the singular value decomposition; and weighting a reference signal with the third weight matrix V in a reverse direction to the other end by using a conjugate matrix $U^*$ for U obtained, based on a result of the singular value decomposition of the acquired channel matrix H, as the transmit weights, and transmitting the reference signal with the transmit weights.

11. A computer readable medium embodying a program of instructions executable by a computer to perform a method of carrying out spatial multiplexing transmission with transmit and receive weights determined by utilizing a matrix $UDV^H$ obtained by singular value decomposition of a channel matrix H with elements that are pairs of transmit antennas and receive antennas, wherein U is a second weight matrix, D is a diagonal matrix, and $V^H$ is a transposed matrix of a third weight matrix V, said method comprising the steps of:

receiving a reference signal weighted with a conjugate matrix $U^*$ for U as the receive weights in a direction from a second communication device to a first communication device and acquiring $H^T U^* = V^* D U^T = V^* D$;

separating the third weight matrix V as the transmit weights in a direction from the first communication device to the second communication device from $V^* D$, based on unitary matrix properties; and weighting data with the transmit weights in the direction from the first communication device to the second communication device and transmitting the data.

* * * * *